United States Patent
Wang et al.

(10) Patent No.: US 10,922,524 B2
(45) Date of Patent: Feb. 16, 2021

(54) OPTICAL PATH MODULATOR AND MANUFACTURING METHOD THEREOF, FINGERPRINT IDENTIFICATION APPARATUS AND TERMINAL DEVICE

(71) Applicant: SHENZHEN WEITONGBO TECHNOLOGY CO., LTD., Shenzhen (CN)

(72) Inventors: Hongchao Wang, Shenzhen (CN); Jian Shen, Shenzhen (CN)

(73) Assignee: SHENZHEN WEITONGBO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/418,992

(22) Filed: May 21, 2019

(65) Prior Publication Data
US 2019/0272410 A1 Sep. 5, 2019

Related U.S. Application Data

(63) Continuation of application No. PCT/CN2017/114620, filed on Dec. 5, 2017.

(51) Int. Cl.
*B44C 1/22* (2006.01)
*G06K 9/00* (2006.01)
*H01L 21/3065* (2006.01)
*G06K 9/20* (2006.01)

(52) U.S. Cl.
CPC ........... *G06K 9/00046* (2013.01); *G06K 9/00* (2013.01); *G06K 9/0004* (2013.01); *G06K 9/20* (2013.01)

(58) Field of Classification Search
None
See application file for complete search history.

(56) References Cited

U.S. PATENT DOCUMENTS

| | | | |
|---|---|---|---|
| 4,569,080 A | 2/1986 | Schiller | |
| 5,200,016 A * | 4/1993 | Namose | B24B 37/013 118/723 R |
| 8,841,213 B2 * | 9/2014 | Shimoi | H01L 21/30608 438/667 |
| 2005/0140737 A1 * | 6/2005 | Ushijima | B41J 2/1628 347/64 |

(Continued)

FOREIGN PATENT DOCUMENTS

| | | |
|---|---|---|
| CN | 1815262 A | 8/2006 |
| CN | 106503635 A | 3/2017 |

(Continued)

*Primary Examiner* — Shamim Ahmed

(57) ABSTRACT

An optical path modulator, applied to a fingerprint identification apparatus, is configured to direct reflected light reflected back from a surface of a finger to an optical detection unit disposed below the optical path modulator, and the optical detection unit is configured to detect the received reflected light, where an array of through holes is arranged between an upper surface and a lower surface of the optical path modulator, and the array of through holes includes a plurality of tilt through holes, where each tilt through hole has a tilt angle greater than 0°, and the tilt angle is an angle between an axial direction of the tilt through hole and a normal direction perpendicular to a surface of the optical path modulator. In a case of the same hole depth, a thinner optical path modulator can be obtained.

6 Claims, 3 Drawing Sheets

(56) References Cited

U.S. PATENT DOCUMENTS

| | | | |
|---|---|---|---|
| 2009/0026581 A1* | 1/2009 | Park | H01L 27/11521 257/607 |
| 2009/0231653 A1* | 9/2009 | Nakamura | B44C 1/227 359/198.1 |
| 2010/0019756 A1* | 1/2010 | Hiraoka | G01N 33/5438 324/71.1 |
| 2014/0218780 A1* | 8/2014 | Mizoguchi | G02B 26/101 359/200.1 |
| 2017/0220838 A1 | 8/2017 | He et al. | |
| 2017/0270342 A1 | 9/2017 | He et al. | |

FOREIGN PATENT DOCUMENTS

| | | |
|---|---|---|
| CN | 106934384 A | 7/2017 |
| CN | 107038434 A | 8/2017 |

* cited by examiner

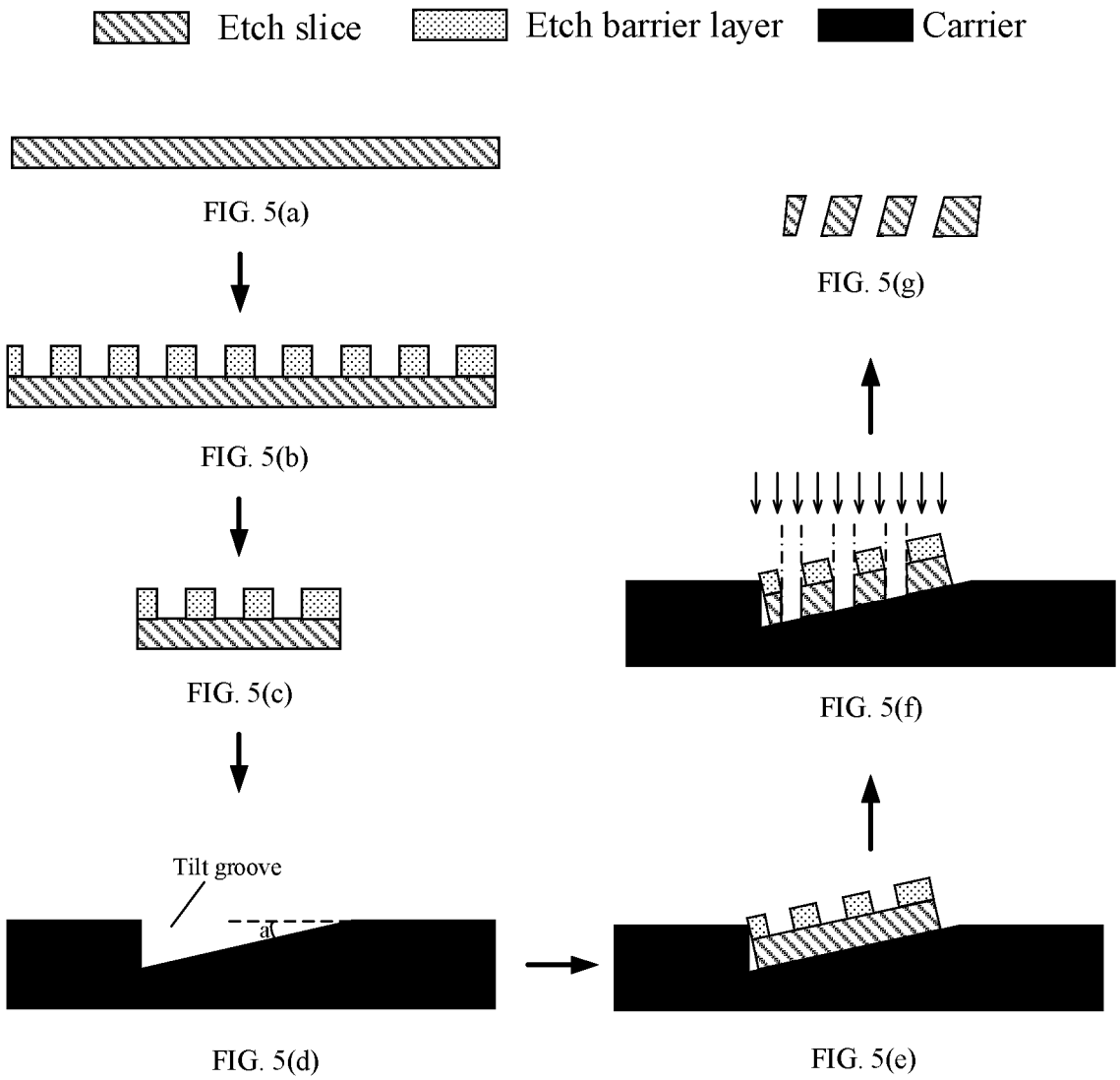
FIG. 5(a) — FIG. 5(g)
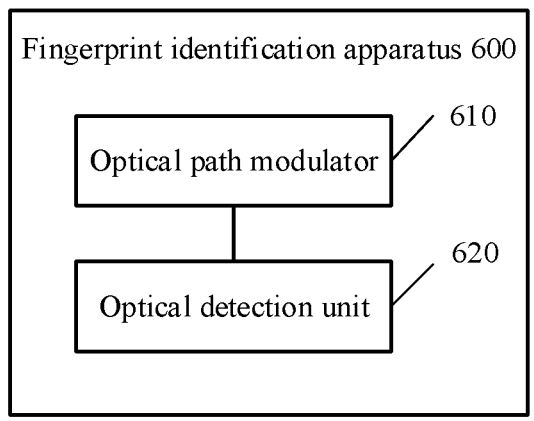
FIG. 6

OPTICAL PATH MODULATOR AND MANUFACTURING METHOD THEREOF, FINGERPRINT IDENTIFICATION APPARATUS AND TERMINAL DEVICE

CROSS-REFERENCE TO RELATED APPLICATIONS

This application is a continuation of International Application No. PCT/CN2017/114620, filed on Dec. 5, 2017, the disclosure of which is hereby incorporated by reference in its entirety.

TECHNICAL FIELD

The present disclosure relates to the field of biometric identification technologies, and more particularly, to an optical path modulator and manufacturing method thereof, a fingerprint identification apparatus and a terminal device.

BACKGROUND

With a wide application of a full screen with a great screen-to-body ratio, there are more and more design demands for under-screen fingerprint identification of a mobile terminal; conventional capacitive fingerprint identification technologies are confronted with a limitation of penetration capability, and difficult to be applied in an under-screen fingerprint identification system. However, optical fingerprint identification technologies could better break through limitations of a display screen and a glass thickness, and thus have a good application prospect.

An optical fingerprint identification system generally uses an optical access path modulator (hereinafter referred to as an optical path modulator) to direct light that is transmitted downward, so as to implement that reflected light reflected by a finger is directed to an optical detection unit, and thus the optical detection unit could obtain a fingerprint image by using a reflection difference of light from finger pattern; and fingerprint identification is implemented on a terminal device according to matching verification of fingerprint feature points, such as a mobile phone. However, thinning a terminal device imposes a strict requirement on a total thickness of an under-screen optical fingerprint module, and is limited by an existing semiconductor etching process, which limits optical path modulation effect of an optical path modulator and an optical imaging effect to some extent.

SUMMARY

Embodiments of the present disclosure provide an optical path modulator and manufacturing method thereof, a fingerprint identification apparatus and a terminal device, where the optical path modulator could be thinner while ensuring effective optical path modulation.

In a first aspect, an optical path modulator is provided, where the optical path modulator is applied to a fingerprint identification apparatus, and is configured to direct reflected light reflected back from a surface of a finger to an optical detection unit disposed below the optical path modulator, and the optical detection unit is configured to detect the received reflected light, where an array of through holes is arranged between an upper surface and a lower surface of the optical path modulator, and the array of through holes includes a plurality of tilt through holes, where each tilt through hole has a tilt angle greater than 0°, and the tilt angle is an angle between an axial direction of the tilt through hole and a normal direction perpendicular to a surface of the optical path modulator.

Therefore, an optical path modulator of an embodiment of the present disclosure has an array of through holes that consists of tilt through holes, and in a case of the same hole depth, it is possible to make the optical path modulator thinner. In other words, in a case where the tilt through holes are ensured to have the same hole aspect ratio, a thinner optical path modulator can be obtained. Moreover, by adjusting a tilt angle of tilt through holes of the optical path modulator, a propagation path and angle of an optical path could be effectively changed, so that modulation of the optical path is more flexible.

In some possible implementation manners, the tilt angle of the tile through hole is greater than 0° and less than 40°.

In some possible implementation manners, the tilt through hole is a circular through hole, an elliptic through hole or a square through hole.

In some possible implementation manners, a material of the optical path modulator is silicon, silicon carbide, silicon oxide or nitride.

In a second aspect, a method of manufacturing the optical path modulator in the foregoing first aspect or in any possible implementation manner of the first aspect is provided, the method including: manufacturing an etch barrier layer on an etch slice according to an etch pattern; fixing the etch slice within a tilt groove in a carrier, a tilt surface of the tilt groove having a predetermined tilt angle with respect to a surface of the carrier; performing etching on the etch slice using the etch barrier layer to manufacture an array of through holes having a plurality of tilt through holes on the etch slice, where each tilt through hole has a tilt angle that is the same as the predetermined tilt angle of the tilt surface, and the tilt angle is an angle between an axial direction of the tilt through hole and a normal direction perpendicular to a surface of the optical path modulator; and forming the optical path modulator based on the etch slice having the array of through holes.

Therefore, by mounting an etch slice within a tilt groove in a carrier, an etch slice having an array of through holes with a plurality of tilt through holes could be obtained without changing process conditions of an existing etching device, so as to manufacture an optical path modulator.

In some possible implementation manners, the fixing the etch slice within the tilt groove in the carrier includes: fixing the etch slice to the tilt surface of the tilt groove by means of temporary bonding or silicon oil gluing.

In some possible implementation manners, the method further includes: cutting the etch slice according to a size of the tilt groove before fixing the etch slice within the tilt groove in the carrier, so as to enable the etch slice to be placed within the tilt groove.

In some possible implementation manners, the predetermined tilt angle of the tile surface is greater than 0° and less than 40°.

In some possible implementation manners, a material of the etch slice is silicon, silicon carbide, silicon oxide or silicon nitride.

In some possible implementation manners, a material of the carrier is silicon, silicon carbide or silicon whose surface is covered with a passivation layer.

In some possible implementation manners, the performing etching on the etch slice using the etch barrier layer includes: performing anisotropic etching on the etch slice using the etch barrier layer.

In some possible implementation manners, the anisotropic etching includes dry plasma etching.

In a third aspect, a fingerprint identification apparatus is provided, including the optical path modulator in the foregoing first aspect or in any possible implementation manner of the first aspect and an optical detection unit disposed below the optical path modulator.

In a fourth aspect, a terminal device is provided, the terminal device including a display screen and the fingerprint identification apparatus in the foregoing third aspect or in any possible implementation manner of the third aspect, where the fingerprint identification apparatus is disposed below the display screen.

BRIEF DESCRIPTION OF DRAWINGS

FIG. 5(a) to FIG. 5(g) are schematic diagrams of a method of manufacturing an optical path modulator of an embodiment of the present disclosure.

FIG. 6 is a schematic block diagram of a fingerprint detection apparatus of an embodiment of the present disclosure.

DESCRIPTION OF EMBODIMENTS

The technical solutions in embodiments of the present disclosure will be described hereinafter in conjunction with the attached drawings.

It should be understood that, the embodiments of the present disclosure may be applied to an optical fingerprint system, which includes but not limited to an optical fingerprint identification system and a medical diagnostic product based on optical fingerprint imaging and the like; and the embodiments of the present disclosure only take an optical fingerprint system as an example for description, which should not constitute any limit to the embodiments of the present disclosure, and the embodiments of the present disclosure are also applicable to other systems adopting optical imaging technologies and the like.

As a common application scene, a fingerprint identification method, a fingerprint identification apparatus and a fingerprint identification chip involved in the embodiments of the present disclosure can be applied to a smart phone, a tablet computer and another mobile terminal having a display screen or another terminal device; and more particularly, in the foregoing terminal devices, a fingerprint identification system may specifically be an optical fingerprint system, which may be disposed in a local area or an entire area below a display screen, thereby forming an under-display (Under-display) optical fingerprint system.

Figure 1:
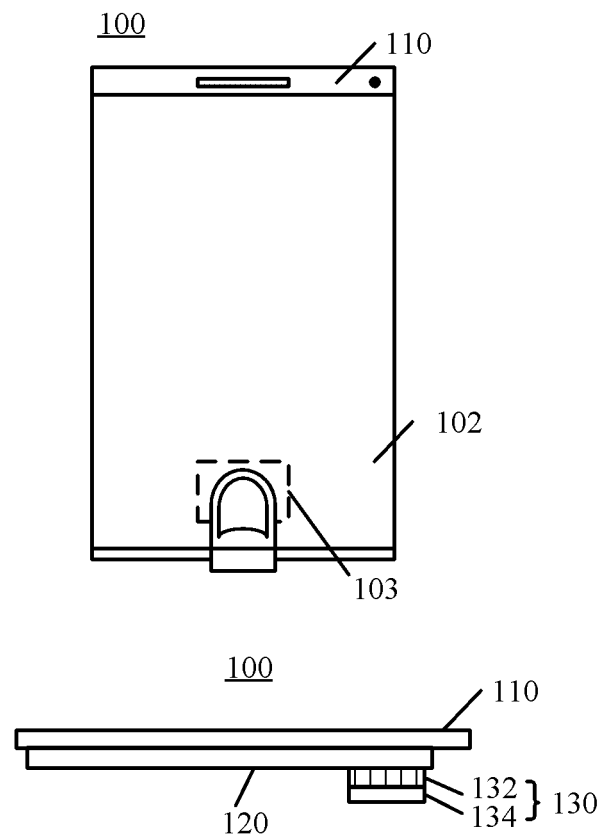
FIG. 1 is a schematic structural diagram of a terminal device applicable to an embodiment of the present disclosure.

FIG. 1 illustrates a schematic structural diagram of a terminal device applicable to an embodiment of the present disclosure. An optical fingerprint system of a terminal device 100 includes a display screen 120 and an optical fingerprint apparatus 130, where the optical fingerprint apparatus 130 is at least disposed in a local area below the display screen 120. The optical fingerprint apparatus 130 may specifically be an optical fingerprint sensor, which includes a sensing array with a plurality of optical sensing units, and an area where the sensing array is located is a fingerprint identification area 103 of the optical fingerprint apparatus 130. As shown in FIG. 1, the fingerprint identification area 103 is located in a display area 102 of the display screen 120, and thus when a user needs to unlock or perform fingerprint verification on the terminal device, fingerprint input can be implemented as long as a finger is pressed on the fingerprint identification area 103 located in the display screen 120. Since fingerprint detection can be implemented inside the screen, a front surface of the terminal device 100 using the foregoing structure does not need to specifically reserve a space to set a fingerprint button (such as a Home button), so that a full screen solution can be adopted, that is, the display area 102 of the display screen 120 can be substantially extended to the entire front surface of the terminal device 100.

As a preferred embodiment, the display screen 120 may be a self-emitting display screen, which adopts a self-emitting display unit as a display pixel, such as an organic light-emitting diode (OLED) display screen or a micro light-emitting diode (Micro-LED) display screen. Taking an OLED display screen as an example, the optical fingerprint apparatus 130 can utilize an OLED display unit (that is, an OLED light source) of the OLED display screen 120 that is located in the fingerprint identification area 103 as an excitation light source for optical fingerprint detection. Moreover, the sensing array of the optical fingerprint apparatus 130 specifically is a photo detector (Photo detector) array including a plurality of photo detectors distributed in an array, and the photo detectors may server as the optical sensing units as described above. When a finger touches, presses, or approaches (collectively referred to as touch in the present disclosure for convenience of description) the fingerprint identification area 103, light emitted by a display unit of the fingerprint identification area 103 is reflected by a fingerprint on a finger surface to form reflected light, where reflected light of a fingerprint ridge of the fingerprint of the finger is different from that of a fingerprint valley of the fingerprint of the finger, and the reflected light from the display screen 120 is received by the photo detector array, and converted into a corresponding electrical signal, that is, a fingerprint detection signal. Fingerprint image data can be obtained based on the fingerprint detection signal, and fingerprint matching verification can be further performed, thereby implementing an optical fingerprint identification function at the terminal device 100.

In other alternative embodiments, the optical fingerprint apparatus 130 may also be disposed in an entire area under the display screen 120, so as to extend the fingerprint identification area 103 to the entire display area 102 of the entire display screen 120, thereby implementing full screen fingerprint detection. Alternatively, the optical fingerprint apparatus 130 may also be disposed in a predetermined area inside the terminal device 100, such as an edge area of the terminal device 100, and a light guiding structure is disposed below the display screen 120 to guide the reflected light of the finger surface to the sensing array of the optical fingerprint apparatus 130.

It should be understood that in a specific implementation, the terminal device 100 may further include a transparent protective cover 110, the cover 110 may specifically be a transparent cover, such as a glass cover or a sapphire cover, which is located on the display screen 120 and covers the front surface of the terminal device 100. Therefore, in the embodiment of the present disclosure, the so-called finger touching, pressing or approaching the display screen 120 may actually refer to the finger touching, pressing or approaching the cover 110 on the display screen 120 or a protective layer covering a surface of the cover 110. In addition, the terminal device 100 may further include a touch sensor, and the touch sensor may specifically be a touch panel, which may be disposed on a surface of the display screen 120 or may be partially or entirely integrated into an interior of the display screen 120, that is, the display screen 120 specifically is a touch control display screen.

As an optional implementation, as shown in FIG. 1, the optical fingerprint apparatus 130 includes an optical detection unit 134 and an optical component 132, where the optical detection unit 134 includes the sensing array, a read circuit electrically connected with the sensing array and other auxiliary circuits, and they may be made on one die (Die) by a semiconductor process; and the optical component 132 may be disposed above the sensing array of the optical detection unit 134, the optical component 132 may specifically include a filter (Filter), an optical path modulator and other optical elements, the filter can be used to filter ambient light penetrating the finger, and the optical path modulator can be mainly used to collimate and modulate light that propagates downward using an array of through holes having a high aspect ratio, thereby implementing guidance of the reflected light reflected from the finger surface to the sensing array for optical detection.

Figure 2:
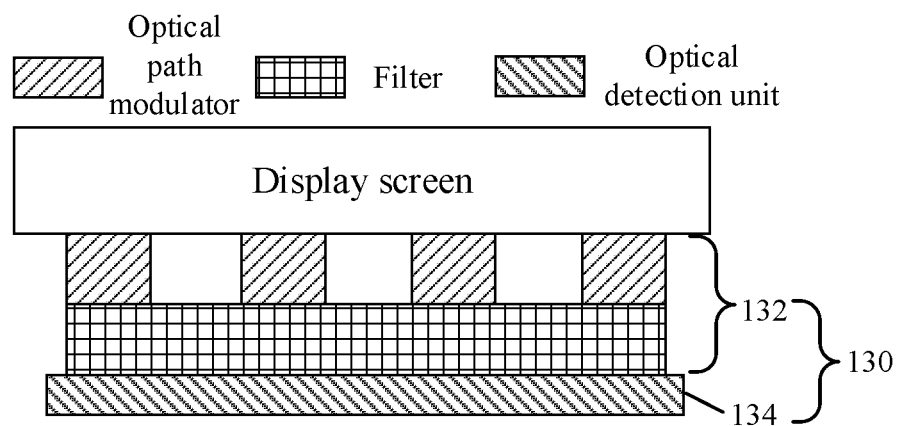
FIG. 2 is one specific schematic diagram of an optical fingerprint apparatus in FIG. 1.

FIG. 2 illustrates the optical fingerprint apparatus 130 in FIG. 1, which includes an optical component 132 and an optical detection unit 134, where the optical component 132 includes an optical path modulator and a filter, light emitted from a displays screen is reflected on a finger surface to be detected on the display screen, and the optical path modulator collimates and modulates the reflected light reflected back from the finger surface through its array of through holes, and directs the reflected light to the filter; the reflected light is received by the optical detection unit 134 after being filtered by the filter; and the optical detection unit 134 can further detect the received reflected light to implement fingerprint identification. It should be understood, the optical fingerprint apparatus 130 shown in FIG. 2 is only an exemplary structure, and in a specific implementation, a position of the filter of the optical component 132 is not limited to being below the optical path modulator; for example, in an alternative embodiment, the filter may also be arranged between the optical path modulator and the display screen, that is, it is located above the optical path modulator; alternatively, the optical component 132 may include two filters, which are respectively arranged above and below the optical path modulator. In other alternative embodiments, the filter may also be integrated into an interior of the optical path modulator, or even omitted, which is not limited by the present disclosure.

In a specific implementation, the optical component 132 may be packaged with the optical detection unit 134 in a same optical fingerprint chip, or may also be installed inside an optical fingerprint module as a part relatively independent of the optical detection unit 134. The optical path modulator may specifically be a collimator (Collimator) layer or a lens (Lens) layer made on a semiconductor silicon wafer or a silicon oxide (such as silicon dioxide) or a nitride (such as silicon nitride), which has a plurality of collimating units or lens units. The collimating units or the lens units may serve as modulating units of the optical path modulator, and particularly, the modulating units may specifically be small holes having a high aspect ratio; in the reflected light reflected from the finger, light that is incident to the modulating units can pass through and be received by the optical sensing units below the modulating units, and each optical sensing unit basically is capable of receiving reflected light of finger pattern that is directed through the small holes above it, so that the sensing array can detect a fingerprint image of the finger.

In the optical fingerprint apparatus 130, each modulating unit of the optical path modulator may respectively correspond to one of the optical sensing units of the sensing array; alternatively, a non one-to-one correspondence relationship may also be used between the modulating units and the optical sensing units of the sensing array to reduce generation of Moire fringe interference, for example, one optical sensing unit may correspond to a plurality of modulating units, or the modulating units may also adopt a manner of an irregular arrangement to implement that there is no specific correspondence relationship between the modulating units and the optical sensing units of the sensing array. When the modulating units of the optical path modulator adopt the manner of irregular arrangement, the optical fingerprint apparatus 130 may correct the reflected light detected by each sensing unit through a post-software algorithm.

Figure 3:
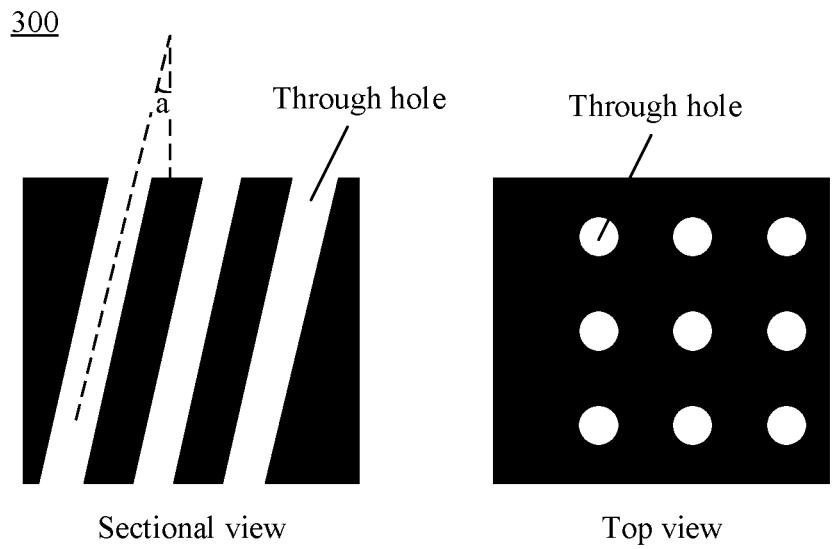
FIG. 3 is a schematic structural diagram of an optical path modulator according to an embodiment of the present disclosure.

FIG. 3 illustrates an optical path modulator 300 of an embodiment of the present disclosure. The optical path modulator 300 may be applied to a fingerprint identification apparatus to serve as an optical path modulator between a display screen and an optical detection unit 134, such as the optical fingerprint apparatus 130 shown in FIG. 1 or FIG. 2. The optical path modulator 300 is configured to direct reflected light reflected back from a surface of a finger to the optical detection unit disposed below the optical path modulator 300, and the optical detection unit is configured to detect the received reflected light to obtain a fingerprint image of the finger.

As shown in FIG. 3, an array of through holes is arranged between an upper surface and a lower surface of the optical path modulator 300, and the array of through holes includes a plurality of tilt through holes, where each tilt through hole may serve as a modulating unit of the optical path modulator 300 for collimation and modulation of reflected light that propagates towards the optical detection unit below the optical path modulator 300. Particularly, an angle a between an axial direction of each tilt through hole in the array of through holes and a normal direction perpendicular to the optical path modulator is greater than 0°. For convenience of description, the foregoing angle a is defined as a tilt angle of the tilt through hole in the present disclosure, that is, the title angle a of the array of through holes of the optical path modulator 300 is greater than 0°. In addition, it should be understood, the foregoing collimation actually refers to directing light so that reflected light that passes through each through hole of the optical path modulator 300 is obliquely incident to a sensing array of the optical detection unit at a predetermined angle (that is, the foregoing angle a greater than 0°).

Preferably, the tilt angle a of the tilt through hole meets $0° < a < 40°$.

A material of the optical path modulator 300 is opaque to a corresponding band used by the fingerprint identification apparatus; for example, the material of the optical path modulator may be silicon, carbide of silicon, oxide of silicon, nitride or the like.

Optionally, the tilt through hole in the array of through holes of the optical path modulator 300 may be a circular through hole, an elliptic through hole or a square through hole; or may also be any other shape of a through hole, which is not limited in the present disclosure.

Therefore, an optical path modulator of an embodiment of the present disclosure has an array of through holes that consists of tilt through holes, and in a case of the same hole depth, it is possible to make the optical path modulator thinner. In other words, in a case where the tilt through holes are ensured to have the same hole aspect ratio, a thinner optical path modulator can be obtained. Moreover, by adjusting a tilt angle of tilt through holes of the optical path modulator, a propagation path and angle of an optical path could be effectively changed, so that modulation of the optical path is more flexible.

On the other hand, in comparison with an optical path modulator using vertical through holes, the through holes having the tilt angle that are provided in the embodiment of the present serve as modulating units of the optical path modulator 300, which can further avoid that the reflected light reflected back from the surface of the finger is directly perpendicularly incident to the optical detection unit below the optical path modulator 300, effectively suppress a noise during transmission of the foregoing reflected light, and improve a signal-to-noise ratio of the fingerprint detection apparatus, thereby effectively improving a fingerprint imaging effect.

It should be noted that it is generally difficult to form a through hole having a tilt angle with a higher accuracy when through-hole etching is performed by adopting a conventional etching technique of a semiconductor manufacture process, and thus it is difficult to manufacture the optical path modulator provided in the embodiment of the present disclosure. In view of this, an embodiment of the present disclosure further provides a method of manufacturing an optical path modulator.

Figure 4:
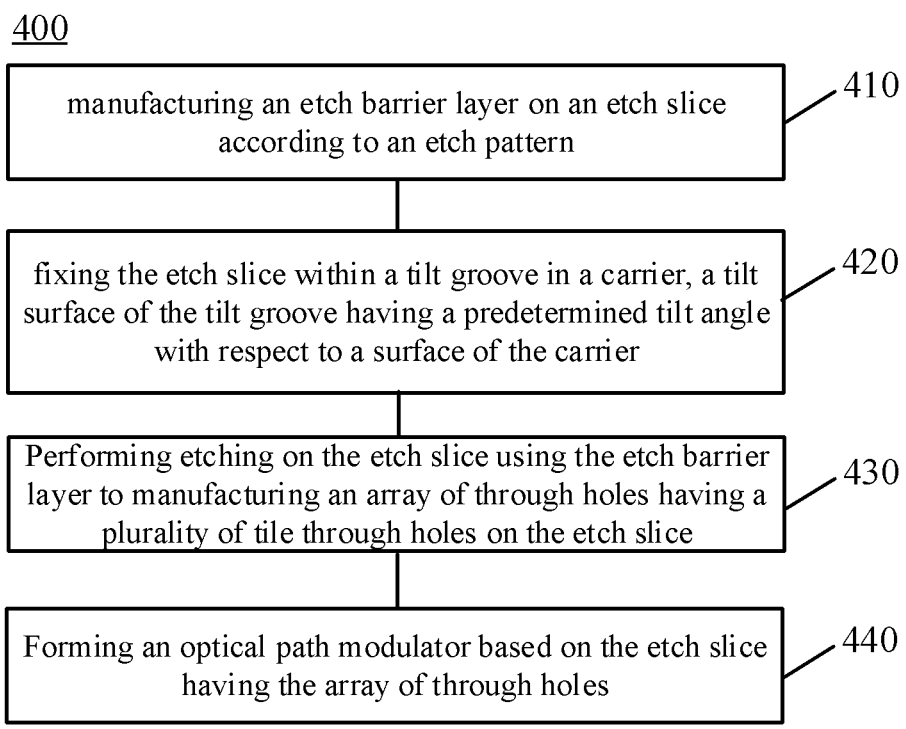
FIG. 4 is a schematic flowchart of a method of manufacturing an optical path modulator of an embodiment of the present disclosure.

Particularly, FIG. 4 illustrates a schematic flowchart of a method 400 of manufacturing an optical path modulator according to an embodiment of the present disclosure. The method may be used to manufacture the optical path modulator 300 shown in FIG. 3, where there is an array of through holes including a plurality of tilt through holes between an upper surface and a lower surface of the optical path modulator 300, where an angle between an axial direction of each tilt through hole and a normal direction perpendicular to a surface of the optical path modulator is greater than 0° (that is, an tilt angle a of each tilt through hole is greater than 0°). The optical path modulator 300 manufactured by adopting the method 400 provided in the embodiment of the present disclosure may be applied to a fingerprint identification apparatus, such as the optical fingerprint apparatus 130 shown in FIG. 1 or FIG. 2.

It should be understood, the fingerprint identification apparatus in the embodiment of the present disclosure may include a fingerprint identification chip, the fingerprint identification chip may be a press-type fingerprint identification chip, a scratch-type fingerprint identification chip or a touch-type fingerprint identification chip, or the like, and the embodiment of the present disclosure is not limited thereto. The fingerprint identification apparatus may be applied to a terminal device, such as a mobile terminal device, such as a smart phone, a tablet computer, a notebook.

Particularly, as shown in FIG. 4, the method 400 of manufacturing the optical path modulator may include step 410, an etch barrier layer is manufactured on an etch slice according to an etch pattern.

Particularly, one etch slice is first prepared, the etch slice is a substrate for manufacturing an optical path modulator, for example, an etch slice shown in FIG. 5(a), and a thickness of the etch slice is the same as a target thickness of the optical path modulator to be manufactured.

In the step 410, the etch pattern may specifically refer to a plane pattern corresponding to an array of through holes to be manufactured, such as a through hole pattern shown in a top view at the right side of FIG. 3.

Then, the etch barrier layer is manufactured on the etch slice; for example, as shown in FIG. 5(b), the etch barrier layer may be formed with a plurality of etch openings, the plurality of etch openings are distributed in an array, and each etch opening respectively corresponds to one of tilt through holes of the array of through holes that is required to be manufactured in the etch slice. In this embodiment, the etching opening of the etch barrier layer may be a through hole perpendicular to a surface of the etch barrier layer, and an opening shape of the etch opening may be designed as that an effective opening area of the etch opening projected horizontally on a surface of the etch slice is identical with its corresponding etch pattern, such as a through hole pattern shown in the top view at the right side of FIG. 3. Optionally, a material of the etch slice is silicon, silicon carbide, silicon oxide or silicon nitride.

As an optional embodiment, the etch slice may be a silicon wafer, the etch barrier layer may be a silicon dioxide layer or a silicon nitride layer grown on the surface of the etch slice, and the foregoing etch opening is formed on the silicon dioxide layer or the silicon nitride layer through an etching process.

Step 420, the etch slice is fixed within a tilt groove in a carrier, and a tilt surface of the tilt groove has a predetermined tilt angle with respect to a surface of the carrier.

Particularly, in the step 420, the carrier having the tilt groove is first provided, and the etch slice having the etch barrier layer is fixed within the tilt groove in the carrier. The tilt groove is used to fix the etch slice so as to enable the etch slice to keep a tilt state during the etching process, and thus an etched through hole is a tilt through hole.

For example, for a carrier carrying a tilt groove shown in FIG. 5(d), the tilt groove may include a vertical surface perpendicular to a surface of the carrier and a tilt surface having a predetermined tile angle a with respect to the surface of the carrier, and an angle between the tile surface of the tile groove and a surface of the carrier (that is, the tilt angle a of the tilt surface) is greater than 0°.

In the step 420, fixing the etch slice to the tilt surface of the tilt groove is mainly to facilitate implementing that, in an array of through holes formed by performing etching on the etch slice, an angle a between an axial direction of each tilt through hole and a normal direction perpendicular to the surface of the etch slice is the same as the tilt angle a of the tilt surface, that is, the predetermined tilt angle of the tilt surface of the tilt groove is equal to an tilt angle of a tilt through hole to be manufactured on the etch slice.

Optionally, the tilt angle a of the tilt surface is greater than 0° and less than 40°.

Optionally, in the step 420, the etch slice may be fixed to the tilt surface of the tilt groove by means of temporary bonding or silicon oil gluing. Moreover, the process can also play a role in heat conduction.

Optionally, the method further includes: cutting the etch slice according to a size of the tilt groove before the step 420, that is, before fixing the etch slice within the tilt groove in the carrier, so as to the etch slice could be placed within the tilt groove.

For example, as shown in FIG. 5(c), the etch slice obtained in FIG. 5(b) is cut into small slices together with the etch barrier layer located above the etch slice, so that they can be placed within the tilt groove in the carrier in FIG. 5(*d*) to be in a tilt placement state shown in FIG. 5(*e*).

As a specific embodiment, the size of the tilt groove in the carrier may be designed to match a size of the optical path modulator, that is, the etch slice can be cut into a plurality of etch slice units, each of the etch slice units is respectively used to manufacture an optical path modulator, and a tilt groove in each carrier may be just used to fixedly place one of the etch slice units. Alternatively, the carrier may also include a plurality of tilt grooves, and each of the tilt grooves is respectively used to fixedly place a etch slice unit, so that performing etch processing on the plurality of etch slice units simultaneously at a same etch step can be implemented in subsequent process steps to respectively form arrays of through holes having tilt through holes.

Step 430, etching is performed on the etch slice using the etch barrier layer to manufacture an array of through holes having a plurality of tilt through holes on the etch slice.

An angle between an axial direction of each tilt through hole and a normal direction perpendicular to the surface of the optical path modulator is equal to the tilt angle of the tilt surface of the tilt groove.

Particularly, in the step 430, the etch slice may be etched by adopting a manner of anisotropic etching, and the etching direction may specifically be a direction perpendicular to the surface of the carrier. Since the etch slice and the etch barrier layer formed on the surface thereof are fixed to the tilt surface of the tilt groove, the etch slice is in a tilt placement state together with the etch barrier layer manufactured on the surface thereof, and there is a certain angle with respect to the surface of the carrier (that is, the tilt angle of the tilt surface).

For example, as shown in FIG. 5(*f*), when etching is performed on the etch slice using the etch barrier layer in a direction perpendicular to the surface of the carrier, part of the etch slice that are blocked by areas in addition to etch openings of the etch barrier layer would not be etched; and since the etch barrier layer is in a tilt state, an opening direction of the etch openings of the etch barrier layer is not perpendicular to the surface of the carrier, edges of the etch openings and part of an inner sidewall would block vertical etching on the etch slice to some extent, and only an effective opening area of the etch opening projected horizontally on the surface of the etch slice (such as the through hole pattern shown in the top view at the right side of FIG. 3) can be etched. Therefore, under the blocking of the etch barrier layer, after the etch slice fixed within the tilt groove is etched, tilt through holes corresponding to the etch pattern can be formed, such as tilt though holes shown in a sectional view at the left side of FIG. 3.

Optionally, a material of the carrier is silicon, silicon carbide or silicon whose surface is covered with a passivation layer.

In the step 430, in the process of performing etching on the etch slice using the etch barrier layer, preferably, the tilt through hole is etched on the etch slice by adopting a manner of anisotropic etching. The anisotropic etching refers to an etching process in which an etch rate in a vertical direction is greater than an etch rate in a horizontal direction, and the anisotropic etching includes but is not limited to dry plasma etching. The adoption of the manner of anisotropic etching can ensure etch precision of the tilt through hole formed on the etch slice, and avoid the influence of the interior of the tilt through hole on optical performance due to lateral etching.

Step 440, the optical path modulator is formed based on the etch slice having the array of through holes.

Particularly, after the etch slice is etched and the array of through holes having tilt through holes is obtained, the etch slice may be separated from the tilt groove by means of cleaning, debonding and the like, and the etch barrier layer on the surface thereof may be removed; moreover, optionally, the etch slice may be further cut to obtain an optical path modulator satisfying requirements on size and shape as shown, for example, in FIG. 5(*g*).

In a method of manufacturing an optical path modulator of the embodiment of the present disclosure, by mounting an etch slice within a tilt groove in a carrier, an optical path modulator having an array of through holes with a plurality of tilt through holes could be manufactured without changing conditions of an existing process device.

FIG. 6 illustrates a schematic block diagram of a fingerprint identification apparatus 600 of an embodiment of the present disclosure. The fingerprint identification apparatus 600 may be applied to the mobile terminal device as shown in FIG. 1 or FIG. 2; and as shown in FIG. 6, the fingerprint identification apparatus 600 includes an optical path modulator 610 and an optical detection unit 620 disposed below the optical path modulator 610. The optical path modulator 610 may be the optical path modulator 300 shown in FIG. 3 described above.

The optical path modulator 610 is configured to direct reflected light reflected back from a surface of a finger to the optical detection unit 620 disposed below the optical path modulator 610, and the optical detection unit 620 is configured to detect the received reflected light, where an array of through holes is arranged between an upper surface and a lower surface of the optical path modulator 610, and the array of through holes includes a plurality of tilt through holes, where each tilt through hole has a tilt angle greater than 0°, and the tilt angle is an angle between an axial direction of the tilt through hole and a normal direction perpendicular to a surface of the optical path modulator 610.

An embodiment of the present disclosure further provides a terminal device, and the terminal device may include a display screen and any one of the fingerprint identification apparatuses of the foregoing embodiments of the present disclosure, where the fingerprint identification apparatus is disposed below the display screen.

It should be understood that the terminal device in the embodiment of the present disclosure may be an electronic device equipped with a fingerprint identification apparatus, such as a mobile phone, a tablet computer, a notebook or the like, and the electronic device may be, for example, a mobile phone equipped with a fingerprint identification chip.

Those of ordinary skill in the art may be aware that, units and algorithm steps of the examples described in the embodiments disclosed in this description may be implemented by electronic hardware, computer software, or a combination of the two. Whether these functions are executed in hardware or software mode depends on the specific applications and design constraint conditions of the technical solutions. Those skilled may implement the described functions by using different methods for each specific application, but this implementation should not be considered to be beyond the scope of the present disclosure.

Those skilled in the art to which the present disclosure pertains may clearly understand that, for convenience and simplicity of description, the specific working processes of the system, the apparatus and the units described above, may refer to corresponding processes in the foregoing method embodiments, and will not be repeated redundantly herein.

In the several embodiments provided in the present disclosure, it should be understood that, the disclosed system, apparatus and method may be implemented in other manners. For example, the apparatus embodiments described above are merely exemplary, e.g., the division of the units is merely a logic function division, other division manners may exist in practical implementation, for example, a plurality of units or components may be combined or integrated to another system, or some features may be omitted or not implemented. From another point of view, the displayed or discussed mutual coupling or direct coupling or communication connection may be indirect coupling or communication connection via some interfaces, apparatuses or units, and may be in electrical, mechanical or other forms.

The units described as separate parts may be or may not be separated physically, and a part displayed as a unit may be or may not be a physical unit, namely, may be located in one place, or may be distributed on a plurality of network units. A part of or all of the units may be selected to achieve the purposes of the solutions in the present embodiments according to actual demands.

In addition, the respective functional units in the respective embodiments of the present disclosure may be integrated in one detection unit, or the respective units singly exist physically, or two or more units are integrated in one unit.

Described above are the specific embodiments of the present disclosure only, but the protection scope of the present disclosure is not limited thereto, those skilled who are familiar with the art could readily think of variations or substitutions within the technical scope disclosed by the present disclosure, and these variations or substitutions shall fall within the protection scope of the present disclosure applicable to the self-interest. Therefore, the protection scope of the present disclosure should be determined with reference to the protection scope of the claims.

What is claimed is:

1. A method of manufacturing an optical path modulator, wherein the optical path modulator is applicable to a fingerprint identification apparatus, for directing reflected light from a surface of a finger to an optical detection unit disposed below the optical path modulator, wherein the method comprises:

forming an etch barrier layer on an etch slice according to an etch pattern;

fixing the etch slice to a tilt surface of a tilt groove in a carrier, the tilt surface of the tilt groove having a predetermined tilt angle with respect to a surface of the carrier, wherein the etch slice is cut according to a size of the tilt groove before fixing the etch slice within the tilt groove in the carrier, so as to enable the etch slice to be placed within the tilt groove;

performing etching on the etch slice using the etch barrier layer to manufacture an array of through holes having a plurality of tilt through holes on the etch slice, wherein each tilt through hole has a tilt angle that is the same as the predetermined tilt angle of the tilt surface, and the tilt angle is an angle between an axial direction of the tilt through hole and a normal direction perpendicular to a surface of the optical path modulator; and forming the optical path modulator based on the etch slice having the array of through holes.

2. The method according to claim 1, wherein the predetermined tilt angle of the tilt surface is greater than 0° and less than 40°.

3. The method according to claim 1, wherein a material of the etch slice is silicon, silicon carbide, silicon oxide or silicon nitride.

4. The method according to claim 1, wherein a material of the carrier is silicon, silicon carbide or silicon whose surface is covered with a passivation layer.

5. The method according to claim 1, wherein the performing etching on the etch slice using the etch barrier layer comprises:

performing anisotropic etching on the etch slice using the etch barrier layer.

6. The method according to claim 5, wherein the anisotropic etching comprises dry plasma etching.

* * * * *